Aug. 17, 1948.　　　　M. C. SHAW ET AL　　　　2,447,034
CENTRIFUGAL FLUID SEAL
Filed Jan. 8, 1945　　　　　　　　　　　　　　3 Sheets-Sheet 1
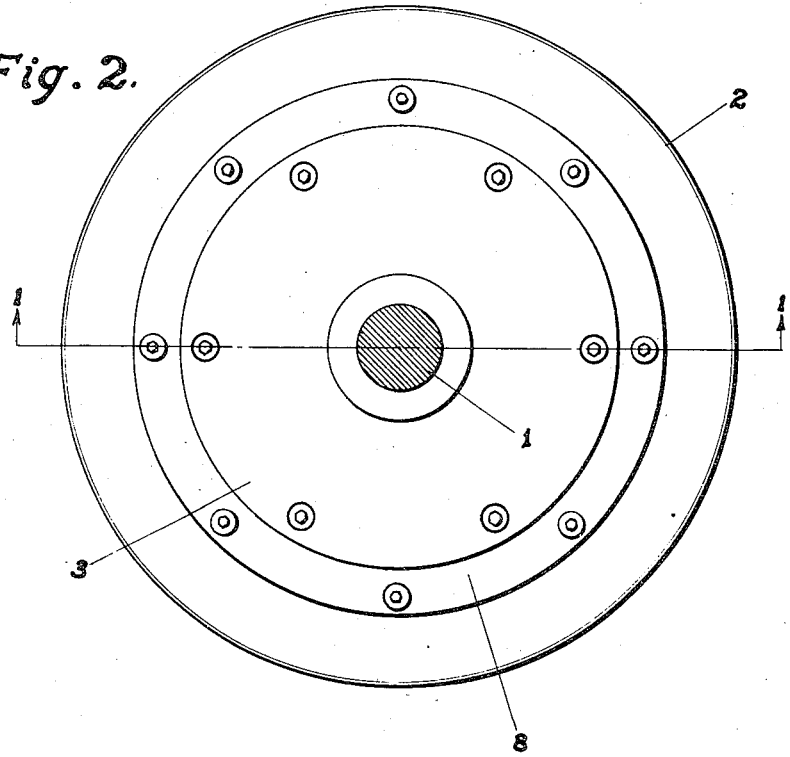
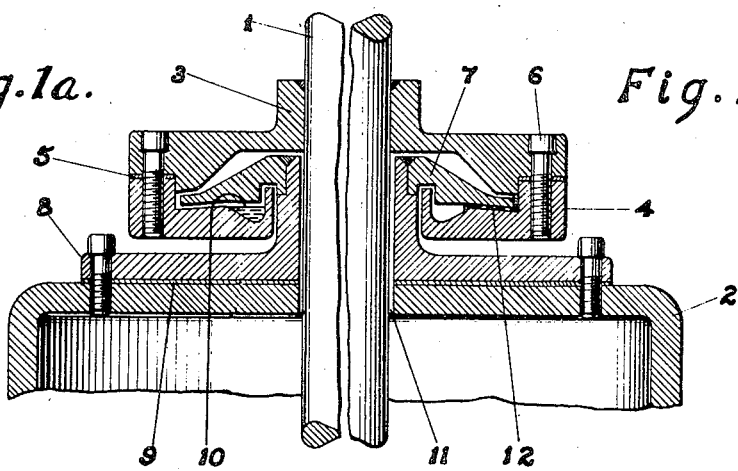
Inventors
Milton C. Shaw
Ormal W. Hart
By
　　　　Attorney Aug. 17, 1948.   M. C. SHAW ET AL   2,447,034
CENTRIFUGAL FLUID SEAL
Filed Jan. 8, 1945   3 Sheets-Sheet 2
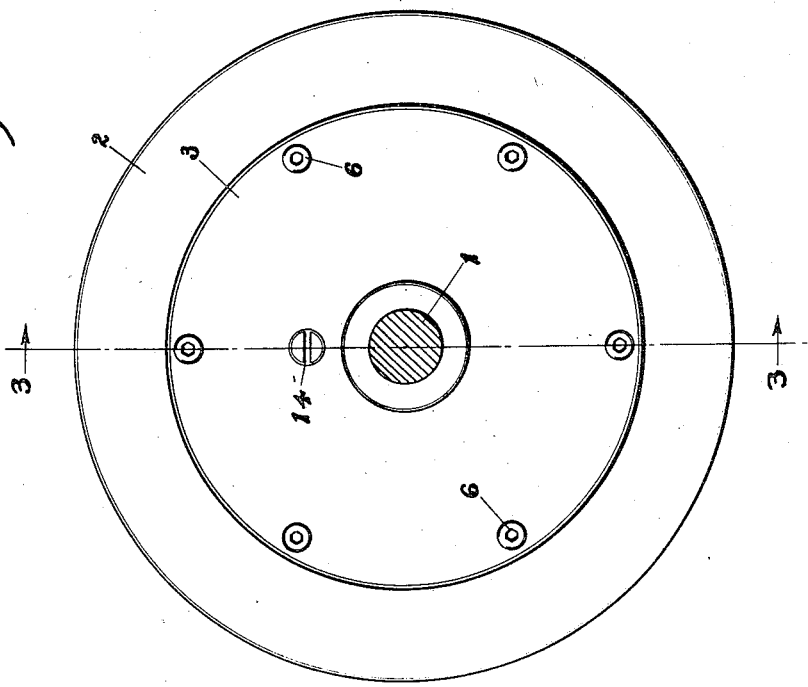
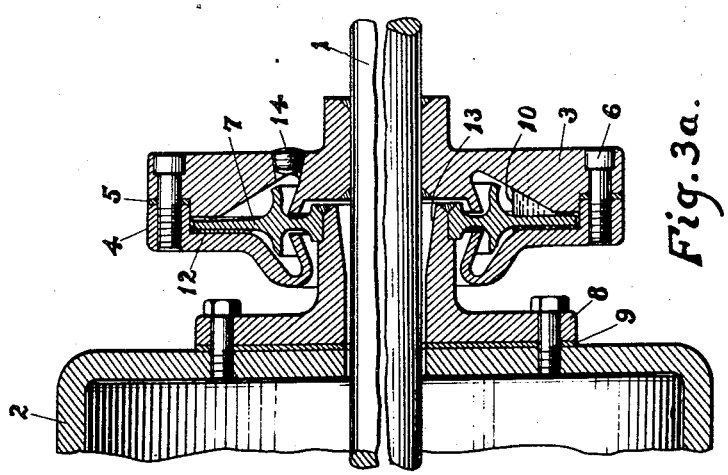
Inventors
Milton C. Shaw
Ormal W. Hart Inventors
Milton C. Shaw
Ormal W. Hart Patented Aug. 17, 1948

2,447,034

UNITED STATES PATENT OFFICE 2,447,034

CENTRIFUGAL FLUID SEAL

Milton C. Shaw and Ormal W. Hart, Cleveland, Ohio

Application January 8, 1945, Serial No. 571,892

1 Claim. (Cl. 286—9)

(Granted under the act of March 3, 1883, as amended April 30, 1928; 370 O. G. 757)

This invention relates broadly to centrifugal sealing devices and more specifically to methods of accomplishing a seal between a shaft and the interior from which the shaft extends. One of the objects thereof is to provide a seal of simple and practical construction. Another object is to provide a device that is completely free from leakage when employed to seal high pressure or vacuum from a region of different pressure. Another object is to provide a low friction seal. Other objects will be in part obvious and in part pointed out hereinafter.

It has been conventional practice to employ labyrinth packing seals at the point at which a shaft extends from a pressure chamber. Such a device cannot effect a perfect seal, particularly with high pressure differences. Furthermore, it has been common practice to employ positive solid contact sealing devices of divers designs. Such devices may effect a perfect seal but give rise to high friction losses, particularly at high rubbing speeds.

Figs. 1 and 1a in the drawings are elevations in section, on line 1—1 of Fig. 2, of a seal embodying the principles of this invention as applied to a vertical shaft, showing the sealing fluid distributed in accordance with operative and inoperative conditions of the shaft respectively.

Fig. 2 is a top plan view of the same.

Figs. 3 and 3a are elevations in section, on line 2—2 of Fig. 4, of a seal embodying the principles of this invention as applied to a shaft which may operate in a horizontal position as shown or in any other position, showing the sealing fluid distributed in accordance with operative and inoperative conditions of the shaft respectively.

Fig. 4 is a top plan view of the same.

Figures 5, 5A:
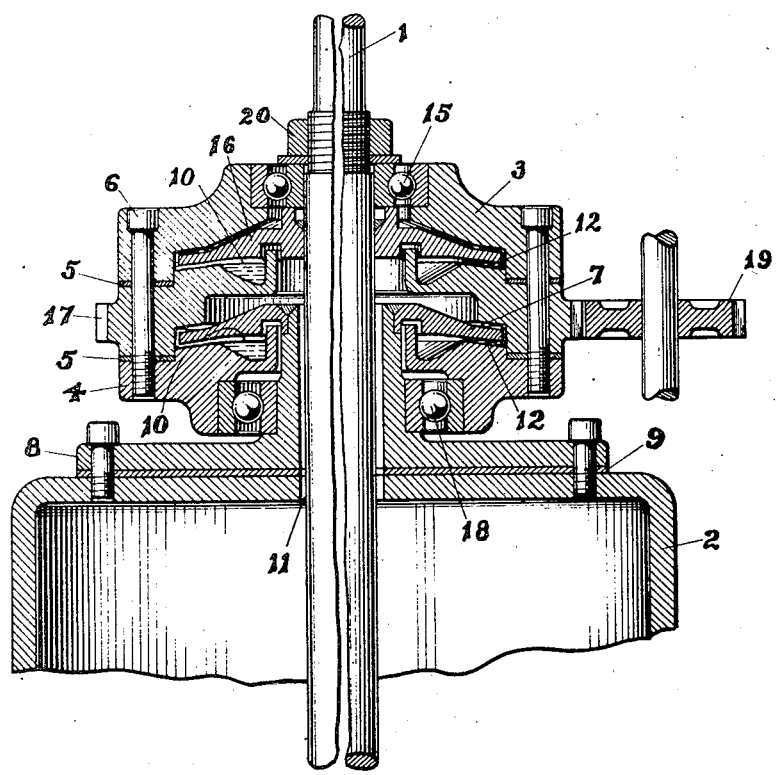
Figs. 5 and 5a are elevations in section through the center of a seal embodying the principles of this invention as applied to a vertical shaft, said seal being operative whether the shaft is stationary or being rotated, showing the sealing fluid distributed in accordance with operative and inoperative conditions of the shaft respectively.

In the accompanying drawings in which like numerals of reference indicate the same parts throughout, 1 is the shaft which extends through the wall of the pressure chamber 2. A cup assembly is securely (here by solder) attached to said shaft of which 3 is the cup cover and 4 the cup. A sealing gasket 5 of neoprene or other suitable material is placed between the two parts of the cup assembly which are securely fastened together by six bolts 6. A stator 7 is pressed upon the upper end of the flanged member 8 and the joint is made gastight (here by solder). The flanged member 8 is securely bolted to the wall of the pressure chamber 2 with a suitable gasket 9. Mercury stands in the cup 4 at the level 10 when the shaft is stationary.

Considering now the assembly of the seal shown in Figs. 1, 1a and 2, the flanged member 8 is first bolted to the pressure chamber wall 2. The cup 4 is next placed over the shaft and allowed to rest on the flange 8. Stator 7 is pressed into position and soldered after which the sealing fluid (in this case 12 cubic centimeters of mercury) is inserted into the cup. The gasket 5 and cover 3 are next placed into position and assembly is completed by clamping the cup and cover together with bolts 6 and soldering the cover to the shaft.

In operation, the shaft and cup assembly rotate, suitable clearance being established between the shaft and flanged member at 11. Due to centrifugal force, the sealing fluid is thrown outward to the periphery of the cup where it effects a seal between the cup, stator, and the cover, taking some position as shown at 12.

In the particular application pictured in Figs. 1, 1a and 2, one side of the seal communicates with the atmosphere while the other side is subjected to the pressure existing in the chamber. Due to the great change in centrifugal force that attends a small radial change of the inner surface of the sealing fluid, a device of the type illustrated in Figs. 1 and 2 is given considerable sealing power. By way of example, the following operating data obtained from a unit essentially the same as the aforementioned vertical seal is cited. It was found that air pressure, 50 pounds per square inch in excess of atmospheric pressure, could be sealed effectively when the speed of the shaft was 2000 R. P. M. The sealing fluid in this instance was mercury. The temperature rise of the entire unit above ambient temperature after operating at 2000 R. P. M. and under a pressure of 50 pounds per square inch for one half hour was but 7° F. Theory predicts a rise in sealing pressure which varies as the square of the rotational speed.

A horizontal seal embodying the principles of this invention is shown in Figs. 3, 3a and 4. The constructional details of this unit are essentially the same as those of the previously described vertical seal with the exception of changes necessary to prevent loss of sealing fluid brought about by the gravitational flow. The clearance space between the flanged member and the shaft 1 is made conical in the horizontal seal at 13 to prevent the loss of sealing fluid. It is convenient to employ a filling plug 14 in the horizontal model so that the sealing fluid may be introduced after the seal has been assembled. It may be readily seen that the construction here shown may likewise be used on a shaft operating in any other position the pockets and baffles being so formed that the mercury or other sealing fluid will not spill out no matter how the axis of the shaft might be turned.

A vertical seal embodying the principles of this invention and capable of producing a seal whether the shaft is rotating or not is shown in Figs. 5 and 5a. In this design the cup assembly consists of three parts: the cover 3, the upper cup 17, and the lower cup 4. Sealing gaskets 5 of neoprene or other suitable material are placed between the cup assembly parts which are securely fastened together by six bolts 6. The cup assembly is supported at the top by a ball bearing 15 which is pressed on the shaft 1 and at the bottom by a ball bearing 18 which is pressed on the flanged member 8. The upper disc 16 is securely fastened (here by solder) to the shaft 1. The lower disc 7 is pressed upon the upper end of the flanged member 8 and the joint is made gastight (here by solder). The flanged member 8 and gasket 9 are securely bolted to the wall of the pressure chamber 2. Mercury stands in the cups 4 and 17 at the levels 10 when the shaft is stationary.

Considering now the assembly of the seal shown in Figs. 5 and 5a, the flanged member 8 is first bolted to the pressure chamber wall 2. Bearing 18 is next pressed into place, following by lower cup 4. The sealing fluid (in this case mercury) is inserted in the lower cup after which the lower disc 7 is pressed into position and soldered. Gaskets 5 and upper cup 17 (containing the sealing fluid) are put in place. Next, upper disc 16 is pressed on shaft 1 and soldered. The gasket 5 and the cover 3 are next placed into position and clamped together with bolts 6. Bearing 15 is then pressed between shaft 1 and cover 3 and assembly is completed by tightening nut 20.

In operation, the cup assembly is rotated by some convenient means such as gear 19. Due to centrifugal force, the sealing fluid is thrown outward to the periphery of the cup where it effects seals between the cups 4 and 17, the disc 7 and 16 and the cover 3, taking positions as shown at 12. A seal is thus effected between the pressure or vacuum chamber and the atmosphere whether shaft 1 is rotating or not. It is advisable to have the cup assembly rotate in the same direction as shaft 1 so that the rate of shear in the fluid in the upper cup 17 shall be reduced when the shaft 1 is in motion.

Considering now the action of this device. The sealing fluid may be any substance possessing a greater density than the fluid being sealed. The differential pressure under which this seal is capable of operating is enhanced by the magnitude of the difference in density between the sealing fluid and the fluid being sealed. The maximum differential pressure is likewise affected by the relative radii of the high and low pressure surfaces of the sealing fluid. The maximum differential pressure will be sealed when the radius to the high pressure surface is a maximum without leakage and the radius to the low pressure sealing fluid surface is a minimum for the quantity of sealing fluid employed. The axial clearance between the surfaces of the rotating member and the stator is without effect regarding the effective differential sealing pressure. The axial clearance is of significance only from the standpoint of the quantity of heat generated in the seal, the heat generated of course decreasing as the clearance space is increased.

It may here be noted that the term "fluid" is used throughout in a broad sense to comprehend a solid, liquid or gas suitable to bring about the action herein described.

Liquid mercury is a valuable sealing fluid. This metal has sufficiently high density so that it is capable of producing a centrifugal seal in conjunction with common liquids and gases. The very low viscosity of mercury (1/20 to 1/25 that of S. A. E. 60 oil at operating temperatures) is fortunate inasmuch as the sole source of power loss in our seal arises from viscous friction. In view of the running temperatures of journal bearings which operate with relatively very small clearance and with oils of relatively high viscosity, the operating temperature of a mercury seal of the type herein described should never become excessive even at extremely high rubbing speeds.

The seals herein described may be very advantageously designed into particularly compact units capable of sealing enormous pressures when used in conjunction with ultra high speed machinery such as aircraft superchargers and steam turbines. Centrifugal seals may be designed to operate in the more usual speed range of 2000 to 3000 R. P. M. and successfully seal air, oil or other fluids against a pressure difference of 100 to 200 pounds per square inch or higher.

An essentially low speed unit may utilize the principle of this invention to seal a high differential pressure by employing gearing or other suitable power transmission devices within the case to increase the speed of the extending shaft to which the centrifugal seal is attached.

While all of the foregoing discussion involves a differential pressure seal between a chamber pressure and a lower surrounding atmosphere, be it known that said seal may likewise be employed in the condition in which the pressure chamber is at a lower pressure than the surrounding atmosphere. Thus, in particular, a centrifugal seal of the type herein described may be employed to effect a perfect seal between a chamber maintained at a vacuum equivalent to the vapor pressure of the mercury (or other fluid) in the seal and the surrounding atmosphere. By suitably cooling the flanged member 8 of Fig. 1, the vapor pressure of the sealing fluid may be reduced to a lower value. Thus, the centrifugal seal offers a method of introducing a rotating shaft into a high vacuum system.

While we have described our invention in detail in its present preferred embodiment, it will be obvious to those skilled in the art, after understanding our invention that various changes and modifications may be made therein without departing from the spirit or scope thereof, as defined in the appended claim.

This invention may be manufactured and used by or for the Government of the United States of America for governmental purposes without the payment of any royalties thereon or therefor.

What is claimed is:

In a sealing means between a wall having differential pressures on its opposite sides and a rotatable shaft passing through said wall, a sleeve projecting from said wall and fitting loosely around said shaft, an annular disc fixed to the end of said sleeve, another annular disc fixed to said shaft and spaced from said first disc, means forming an annular chamber around each of said discs with small clearance about their peripheral portions and with pockets for retaining a quantity of sealing fluid when not in motion, means and said sleeve and between said chamber means and said shaft, means for rotating said chamber means to throw said sealing fluid into said small clearance so as to form a positive seal against said differential pressure independently of the rotation of said shaft.

MILTON C. SHAW.
ORMAL W. HART.

REFERENCES CITED

The following references are of record in the file of this patent:

UNITED STATES PATENTS

| Number | Name | Date |
| --- | --- | --- |
| 1,014,850 | Richardson | Jan. 16, 1912 |
| 1,487,849 | Grauert | Mar. 25, 1924 |
| 1,784,104 | Masterson et al. | Dec. 9, 1930 |
| 2,284,465 | Wood | May 26, 1942 |

FOREIGN PATENTS

| Number | Country | Date |
| --- | --- | --- |
| 147,600 | Great Britain | 1921 |
| 721,401 | France | 1931 |

Certificate of Correction

August 17, 1948.

Patent No. 2,447,034.     MILTON C. SHAW ET AL.

It is hereby certified that error appears in the printed specification of the above numbered patent requiring correction as follows:

Column 5, line 8, after the word and comma "motion," insert *antifriction bearings between said chamber*; and that the said Letters Patent should be read with this correction therein that the same may conform to the record of the case in the Patent Office.

Signed and sealed this 21st day of December, A. D. 1948.

[SEAL]

THOMAS F. MURPHY,
*Assistant Commissioner of Patents.*